US008145236B2

(12) United States Patent
Ghosh et al.

(10) Patent No.: US 8,145,236 B2
(45) Date of Patent: Mar. 27, 2012

(54) APPROACH TO SECURE LOCALIZATION IN WIRELESS NETWORKS (75) Inventors: Abhrajit Ghosh, Edison, NJ (US);
Vikram Kaul, Randolph, NJ (US);
David Famolari, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 869 days.

(21) Appl. No.: 12/196,029

(22) Filed: Aug. 21, 2008

(65) Prior Publication Data
US 2009/0186602 A1 Jul. 23, 2009

Related U.S. Application Data (60) Provisional application No. 61/022,967, filed on Jan. 23, 2008.

(51) Int. Cl.
*H04W 24/00* (2009.01)
(52) U.S. Cl. .............. 455/456.1; 455/412.1; 455/410; 455/343.1; 455/466; 380/247; 713/300
(58) Field of Classification Search .............. 455/410, 455/414.1, 456.1–456.2, 456.5–456.6, 574; 370/311, 318; 713/300–350; 380/247
See application file for complete search history.

(56) References Cited

U.S. PATENT DOCUMENTS

| 7,003,325 | B2 * | 2/2006 | Matsutani et al. | 455/562.1 |
|---|---|---|---|---|
| 7,437,167 | B2 * | 10/2008 | Kartchner | 455/456.1 |
| 7,460,863 | B2 * | 12/2008 | Steelberg et al. | 455/419 |
| 7,502,613 | B2 * | 3/2009 | Namiki et al. | 455/435.1 |
| 7,591,020 | B2 * | 9/2009 | Kammer et al. | 726/26 |
| 7,716,740 | B2 * | 5/2010 | Robert et al. | 726/23 |
| 2007/0247367 | A1 | 10/2007 | Anjum et al. | |
| 2007/0283442 | A1 * | 12/2007 | Nakano et al. | 726/26 |
| 2007/0287411 | A1 | 12/2007 | Kim et al. | |

OTHER PUBLICATIONS

Written Opinion from corresponding PCT application citing the above two publications is also submitted.

* cited by examiner

*Primary Examiner* — Kamran Afshar
*Assistant Examiner* — Kathy Wang-Hurst
(74) *Attorney, Agent, or Firm* — Westerman, Hattori, Daniels & Adrian, LLP (57) ABSTRACT Embodiments of the present invention disclose a secure localization infrastructure using transmitters that can transmit messages at multiple distinct power levels throughout a community of reference points. Transmitters send messages at different power levels in a manner that every location in the system corresponds to a unique set of messages. Received messages are reported back to the localization infrastructure, which then determines location by comparing the messages reported.

24 Claims, 6 Drawing Sheets

Localization Errors for increasing power levels

FIG. 4

Localization errors with SM report suppression

FIG. 5

Rate of SM Suppression Detection using σ = 80%

APPROACH TO SECURE LOCALIZATION IN WIRELESS NETWORKS

This application is a non-provisional of U.S. Provisional Application No. 60/022,967, filed on Jan. 23, 2008, which is hereby incorporated by reference in its entirety.

BACKGROUND

1. Field of the Invention

The present invention relates to wireless network communications. More particularly, the present invention relates to secure localization in wireless networks.

2. Description of the Related Art

Location schemes for wireless networks are typically based on the features of the underlying physical layer. For example, some traditional schemes have been based on ultrasound, infrared, Bluetooth, or 802.11 RF networks. These schemes infer the location of users by measuring various parameters such as received signal strength indicator (RSSI), time of flight, and angle of arrival. Some of these schemes are client based, that is, they rely on the client to determine its own location, while others are network based where the network infrastructure is used to determine location.

Traditional location schemes normally rely on measuring the signal strength (SS) parameter of transmitted signals. A SS map is determined that represents the SS at various locations. The system then tries to determine location based on the best match between observed signal strength and the SS map. In such systems, however, the emphasis is on localization while the presence of malicious users is neglected. Services in which location determination is a major component would attract the attention of adversaries whose goal would be to try to deceive the location system.

Global Positioning System (GPS) is currently a popular location technology. GPS relies upon a GPS receiver (client) to compute location using received satellite signals. The location is then reported to any interested systems. Such a process, however, is prone to compromise in that malicious end users can provide incorrect location reports, thus deceiving the system. When using GPS-based location systems, it is therefore necessary to investigate and employ alternative technologies for determining location securely.

One solution for secure location determination is to use the time-of-flight technique. In the time-of-flight technique, each end-user device is required to have equipment that can reflect back, that is, return, transmitted signals without any delay. Various techniques, such as verifiable multilateration, can then be combined with this basic idea to ensure that end users will not be able to falsify location. One problem with this approach, however, is the additional cost associated with the infrastructure necessary for implementation. Accordingly, what is needed is a localization system for operation over a network that provides location determination securely in a cost effective manner.

SUMMARY OF THE INVENTION

According to some embodiments of the present invention, a secure localization system is provided that comprises at least one secure message transmitter (SMT) for transmitting secure messages (SMs) using multiple transmission power levels. The SMs comprise a set of identifiers comprising identifiers for the SMT transmitting the message and power level used for transmission, and an identifier for each SM itself. The system further comprises a plurality of reference points (RPs) deployed at known locations, and a localization controller configured to instruct each SMT to transmit SMs at specific power levels for receipt at the RPs. Each RP is configured to receive SMs and report the received SMs to the localization controller; each report contains an identifier for the RP in addition to the SM received by it. The localization controller determines location by comparing reports received.

Embodiments of the present invention further provide a method for secure localization. The method comprises iteratively selecting each of a set of transmission power levels at one or more secure message transmitters (SMTs). The method further comprises generating secure messages (SMs) at one or more of the SMTs. The SMs include a set of identifiers comprising identifiers for the SMT transmitting the message and power level used for transmission, and an identifier for each SM itself. The method further comprises requesting each SMT to transmit a specific number of SMs at selected power levels, and, responsive to the request, transmitting the specific number of SMs at the specified power level to a plurality of reference points (RPs) deployed at known locations. For every RP that receives an SM, the method includes reporting the received SM to a localization controller, each report containing an identifier for the RP in addition to the SM received by it. Location is determined by comparing reports received.

Additional embodiments of the present invention still further provide a localization controller comprising a processor configured to instruct at least one secure message transmitter (SMT) to transmit secure messages (SMs) at a specific power level to a plurality of reference points (RPs). The RPs are deployed at known locations throughout a localization area. The SMs include a set of identifiers comprising identifiers for the SMT transmitting the SMs and power level used for transmission, and an identifier for each SM itself. The processor is further configured to receive SM reports transmitted by the RPs. Location can be determined by comparing the SM reports received.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present invention will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present invention will now be described more fully with reference to the accompanying drawings. The matters exemplified in this description are provided to assist in a comprehensive understanding of various embodiments of the present invention disclosed with reference to the accompanying figures. Accordingly, those of ordinary skill in the art will recognize that various changes and modifications of the embodiments described herein can be made without departing from the scope and spirit of the claimed invention. Descriptions of well-known functions and constructions are omitted for clarity and conciseness.

Embodiments of the present invention enable implementation of a low cost secure location determination system. The system can use the same radio hardware and capabilities for both communication and localization, thereby resulting in tremendous cost savings. The system exploits the capabilities of network devices to transmit signals at different power levels. Each power level can generate a different transmission range. A transmitter in the system at a given time associates messages with each power level and securely broadcasts those messages at that power level. As a result, a user device at any location will receive a unique set of messages from multiple transmitters at any given point in time. The user device is expected to securely report the messages received to the localization infrastructure. The location of the user device is then determined based on the set of reported messages.

Figure 1:
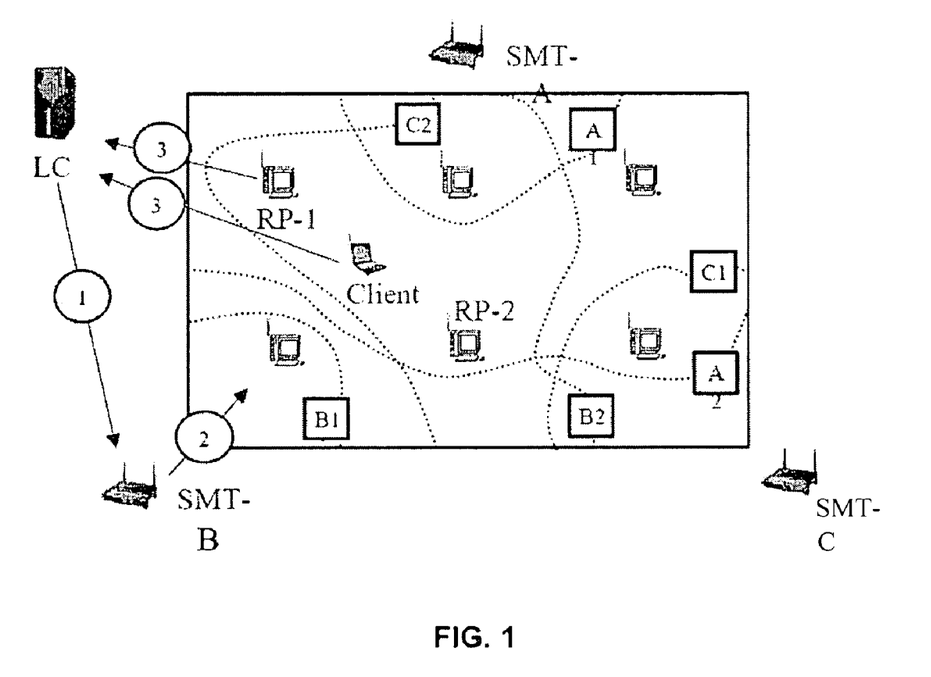
FIG. 1 illustrates the functional components of a localization system in accordance with an embodiment of the present invention.

FIG. 1 illustrates the functional components of a localization system in accordance with an exemplary embodiment of the present invention. As shown in FIG. 1, the localization scheme makes use of a set of Secure Message Transmitters (SMTs) that are positioned proximate to the region where localization is to occur; for example, at the periphery of the region within which a client is to be localized. Every SMT has a wired as well as a wireless network interface. Each SMT transmits Secure Messages (SMs) over its communication interface using multiple transmission power levels. For example, SMT-A transmits SMs at power levels A1 and A2; SMT-B transmits SMs at power levels B1 and B2; and SMT-C transmits SMs at power levels C1 and C2.

A Secure Message (SM) is broadcast using User Datagram Protocol (UDP). It contains an identifier for the SMT that transmitted the message and the power level used for the transmission. It also contains an identifier for the SM since multiple SMs may be transmitted at the same power level. The content of an SM may be specified as:

<SMT-id, PL-id, SM-id>.

Reference Points (RPs) are deployed at known locations within the localization region. Every RP has a wired as well as a wireless network interface. An RP receives SMs from all the SMTs over the wireless interface and reports the received SMs to the Localization Controller (LC) over its wired or wireless interface. Each report comprises the identifier for the RP in addition to the SM received by it.

Items or entities to be located, that is, clients, may be arbitrarily located within the localization area. A client has only a wireless network interface that it uses to receive SMs from all the SMTs. It reports received SMs to the LC over its wireless interface.

The LC is used to instruct the SMTs to transmit SMs at specific power levels. The LC communicates with the SMTs over their wired or wireless interfaces. The LC also receives SM reports from RPs and the client. The LC uses RP and client SM reports to estimate the location of the client.

The LC includes a processor that is configured to instruct at least one SMT to transmit SMs at a specific power level to a plurality of RPs deployed at known locations throughout the localization area. The SMs include a set of identifiers comprising identifiers for the SMT transmitting the SMs and power level used for transmission, and an identifier for each SM itself. The processor is further configured to receive SM reports transmitted by the RPs, wherein location can be determined by comparing the SM reports received. The processor is further configured to receive reports transmitted from a client in response to SMs transmitted to the client, and estimate the RPs nearest the client. Client positioning can be determined by comparing SMs reported by the RPs with the SM reports transmitted by the client.

The localization controller can also include a random number generator for generating random numbers for inclusion within the SMs, and a data structure for storing data associated with the SMs, wherein the data comprises random numbers generated for a particular SMT, power level and SM identifier set.

Figure 2:
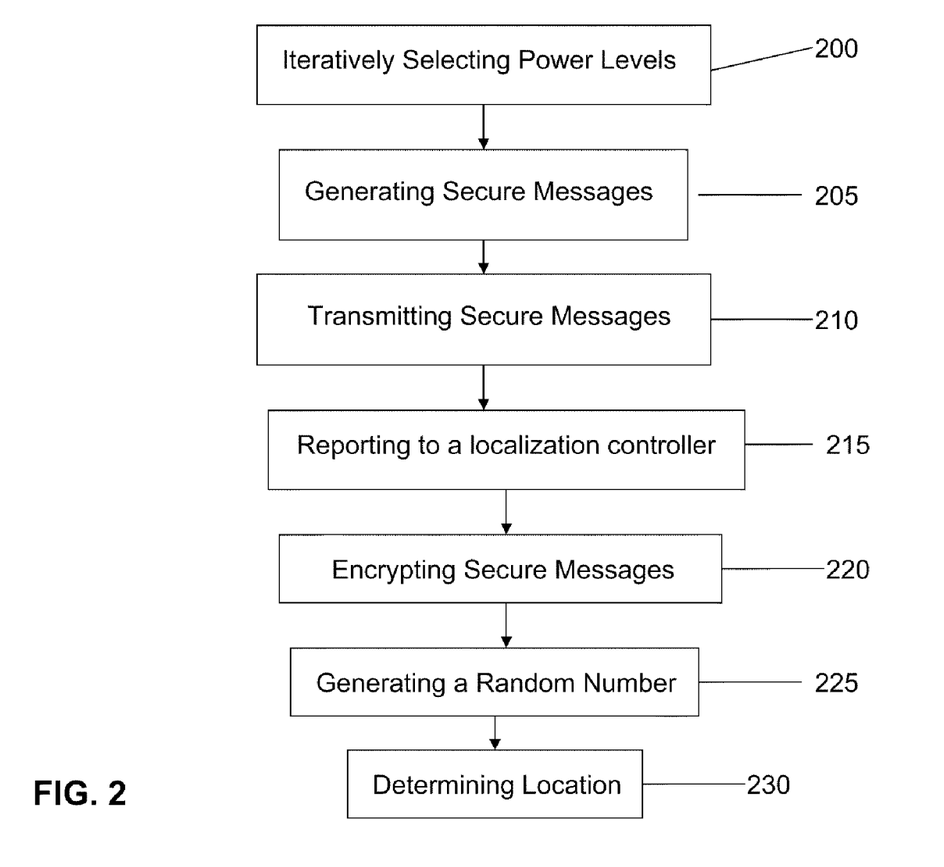
FIG. 2 is a flow diagram depicting certain steps of a method of secure localization in accordance with an embodiment of the present invention.

FIG. 2 is a flow diagram depicting certain steps of a method of secure localization in accordance with an embodiment of the present invention. In step 200, the LC iteratively selects each of a set of transmission power levels at one or more secure message transmitters (SMTs). In certain embodiments the LC iterates over all SMTs. At each SMT, the LC iteratively selects each of a set of transmission power levels. The LC requests each SMT to transmit a specific number of SMs at selected power levels. In step 205, SMs are generated at one or more of the SMTs. The SMs comprise a set of identifiers comprising identifiers for the SMT transmitting the message and power level used for transmission, and an identifier for each SM itself. In response to requests from the LC, each SMT transmits an SM at the specified power level to a plurality of reference points (RPs) deployed at known locations in step 210. In step 215, for every RP that receives an SM, reporting the received SM to the LC, each report containing an identifier for the RP in addition to the SM received by it. When clients are to be localized, SMs are transmitted to the client and, responsive to receipt of the SMs, reporting the received SMs to the LC. In exemplary embodiments SMs are encrypted, step 220, and a random number is generated for inclusion within an SM, step 225. The random number is then associated with a particular SMT identifier, power level identifier and SM identifier. In certain embodiments a record of the last generated random number is maintained. Once all SM reports have been received by the LC, in step 230, location is determined by comparing reports received. In certain embodiments the determining step comprises estimating the RPs nearest the client and comparing the SMs reported by the client with those reported by the nearest estimated RPs. In exemplary embodiments, location can be determined in accordance with the Localization Algorithm described below. Other algorithms known to those of ordinary skill in the art can also be used to determine location.

Exemplary embodiments of the present invention employ a localization algorithm at the LC to compare SM reports transmitted from the RPs and a client to determine the RPs closest to the client. The location of the client is computed relative to the location of its closest RPs. Before describing the localization algorithm, it will be helpful to establish some relevant definitions/conventions.

Convention: Transmission power levels at an SMT have an associated numeric identifier. Further, a higher power level has a greater numeric identifier than a lower power level.

In the definitions below, p is used to indicate the numeric identifier associated with power level.

Definition: $\phi(s,p,r)$: This is equal to 1 if the ratio of the number of SMs received at the RP/client r from SMT s transmitted at power level p, to the total number of SMs transmitted at the power level p by the SMT s, exceeds a threshold $\rho$. Otherwise it is defined to equal 0.

The threshold $\rho$ is a system parameter that can have a value in the range [0,1]. For the experiments discussed below, $\rho$ was set to 0.7.

Definition: $\chi(s,r)$: This is defined to equal the numeric identifier for the lowest power level p used at SMT s such that $\phi(s,p,r)$ equals 1 for the RP/client r. In case no such p exists, it is defined to be $\infty$.

Definition: $\psi(s,p,r)$: This is defined to equal 1 for every power level $p \geq \chi(s,r)$ for any given SMT s and RP/client r. Otherwise it is defined to equal 0.

Definition: $\delta(r,c)$: Given an RP r and a client c, this function is defined as:

$$\delta(r, c) = \sum_{\forall s} \sum_{\forall p} |\psi(s, p, r) - \psi(s, p, c)|.$$

$\delta(r,c)$ provides a measure of the disparity between the sets of SMs received at an RP r and a client c.

Based on the above, the localization algorithm for a client c can be specified as follows:
Step 1
Compute $\phi(s,p,r)$ $\forall$ SMTs s $\forall$ PLs p $\forall$ RPs r
Compute $\phi(s,p,c)$ $\forall$ SMTs s $\forall$ PLs p
Step 2
Compute $\chi(s,r)$ $\forall$ SMTs s $\forall$ RPs r
Compute $\chi(s,c)$ $\forall$ SMTs s
Step 3
Compute $\psi(s,p,r)$ $\forall$ SMTs s $\forall$ PLs p $\forall$RPs r
Compute $\psi(s,p,c)$ $\forall$ SMTs s $\forall$ PLs p
Step 4
Compute $\delta(r,c)$ $\forall$ RPs r
Find 2 RPs $r_1$, $r_2$ such that $\delta(r_1,c) \leq \delta(r_2,c) \leq \delta(r,c) \forall$ RPs r
Step 5
Estimate coordinates $(x_c, y_c)$ for client c as:

$$x_c = \sum_{i=1}^{2} \frac{\frac{1}{\delta(r_i, c)}}{\sum_{j=1}^{2} \frac{1}{\delta(r_j, c)}} x_i; \quad y_c = \sum_{i=1}^{2} \frac{\frac{1}{\delta(r_i, c)}}{\sum_{j=1}^{2} \frac{1}{\delta(r_j, c)}} y_i$$

where $(x_1,y_1)$ and $(x_2,y_2)$ are the coordinates of $r_1$ and $r_2$ respectively.
Reference Points (RPs)

The use of RPs provides a means to deal with the time varying nature of signal propagation in an indoor environment since they provide an instantaneous map of the signal propagation. It may be argued that RPs can be expensive to deploy because of the additional hardware requirements. In an enterprise environment, however, RPs may be readily available since such environments typically employ a variety of network terminals that can serve as RPs, such as desktop computers allocated to employees. In the empirical testbed described below, Windows-based PCs with cheap USB network cards are used to prove that such deployment is feasible.
Use of Lowest Power Level Received In ideal radio signal propagation conditions, it is expected that for a pair of transmission power levels p1 and p2, if p1<p2 then $\phi(s,p1,r) \leq \phi(s,p2,r)$, that is, the number of SMs received from a higher power transmission should, in general, exceed the number of SMs received from a lower power transmission. In practice, however, this may not always happen, especially for power levels that are close to each other or in cases of transient wireless interference. Such cases are treated as errors and make use of $\psi(s,p,r)$ to provide a level of error correction. The use of $\psi(s,p,r)$ (rather than $\phi(s,p,r)$) to compute $\delta(r,c)$ provides the required error correction since, by definition, $\psi(s,p1,r) \leq \psi(s,p2,r)$ if p1<p2.
Client Location Estimation in Terms of RP Coordinates The implicit assumption is that the SM set received at the client will be closest to the SM set received by its closest RPs. As shown in Step 5 above, the coordinates of the two nearest RPs are weighted to estimate the location of the client. The RP with a lower value for $\delta(r,c)$ is given a higher weight than the other. While the two nearest RPs are used to estimate a client's location, it is conceivable that in a larger deployment with more RPs a larger number of RPs could be used to provide the estimate.
SM Properties As discussed above, a malicious client can deceive most current localization technologies. Exemplary embodiments of the present invention ensure that a client cannot deceive the system about its true location. Enforcing the following properties for SMs can facilitate this objective.
1) SM Contents are Hidden from Clients.

This property is enforced by deploying a shared symmetric encryption key at every SMT and at the LC. Each SMT is capable of encoding or encrypting the generated SMs with an encryption key while the LC decrypts the SM using the same key. This ensures that a client cannot access the content of a received SM.
2) SMS Cannot be Replayed by Clients This property is enforced by incorporating a random number generator at the LC. The LC generates a random number prior to sending a request to an SMT. This random number is incorporated into the SM transmission request. The SMT adds the received random number to the SM contents. With the addition of a random number, the fields of the SM are:
<SMT-id, PL-id, SM-id, random-number>.

In certain embodiments the LC maintains a record of the last generated random number for a particular SMT-id, PL-id and SM-id set. In the event that a client attempts to report an SM received at a previous location, the LC will be able to detect a mismatch between the last used random number for that SM with the random number contained in the client's SM report.
3) The Relative Power Level of an SM Transmission Cannot be Inferred by a Client Since the power level identifier (PL-id) can be encoded or encrypted within the SM, a client that receives the SM cannot extract it's transmission power. Further, even if a client has a means to measure the signal strength at which an SM is received, and thereby attempt to assess its relative transmission power, the client will be unable to distinguish between the case when an SM is transmitted at a low power level and the case when the SM is transmitted from a great distance.

4) A Client Cannot Determine the SMT that Transmitted a Specific SM

Since the SMT identifier (SMT-id) can be encoded or encrypted within an SM, the latter cannot be used by a client to infer the source of the transmission. Further, all the SMTs' wireless interfaces are configured with identical Layer 2 (MAC) and Layer 3 (IP) addresses. Any SM transmitted by any of the SMTs will contain identical source address information at both Layer 2 and Layer 3.

Security Hypotheses

The properties discussed above ensure that a client is unable to infer the source of an SM transmission, the power level of the SM transmission or the content of the same. Further, a client is also unable to generate spurious SMs or replay SMs received at a previous location. Thus, it is evident that the only way in which a malicious client can attempt to deceive the localization system of the present invention is by randomly suppressing SMs in its report to the LC.

The following pair of hypotheses regarding the security properties of the localization system are based on the client's restricted capabilities as discussed in the previous paragraph.

Hypothesis 1: If a client suppresses a small fraction of received SMs in its report to the LC it will not be able to effect a significant deviation for its location estimate as made by the localization system.

Hypothesis 2: If a client suppresses a large fraction of received SMs in its report to the LC it will report a significantly smaller number of SMs than the RPs at the estimated location.

The above hypotheses imply that if a client is able to deceive the localization system into making a significantly erroneous location estimate, the system will be able to detect this by comparing the number of SMs reported by the client with those reported by its nearest estimated RPs. In the section that follows, experimental verification of these hypotheses is described using an empirical testbed. The empirical testbed provides a specific implementation of an embodiment of the present invention. It should be understood that other implementations can be provided as construed in accordance with the teachings of the present invention. Thus, discussion of the empirical testbed should in no way be construed as limiting the reach and scope of the present invention as defined by the appended claims below.

Empirical Evaluation

The results of the experimental verification using the empirical testbed are presented in this section. An overview of the empirical testbed used for experimentation is first presented. Then, results are provided that illustrate the accuracy of the localization algorithm. Finally, experimental verification of the Security Hypotheses discussed above is addressed.

1) Empirical Testbed

Figure 3:
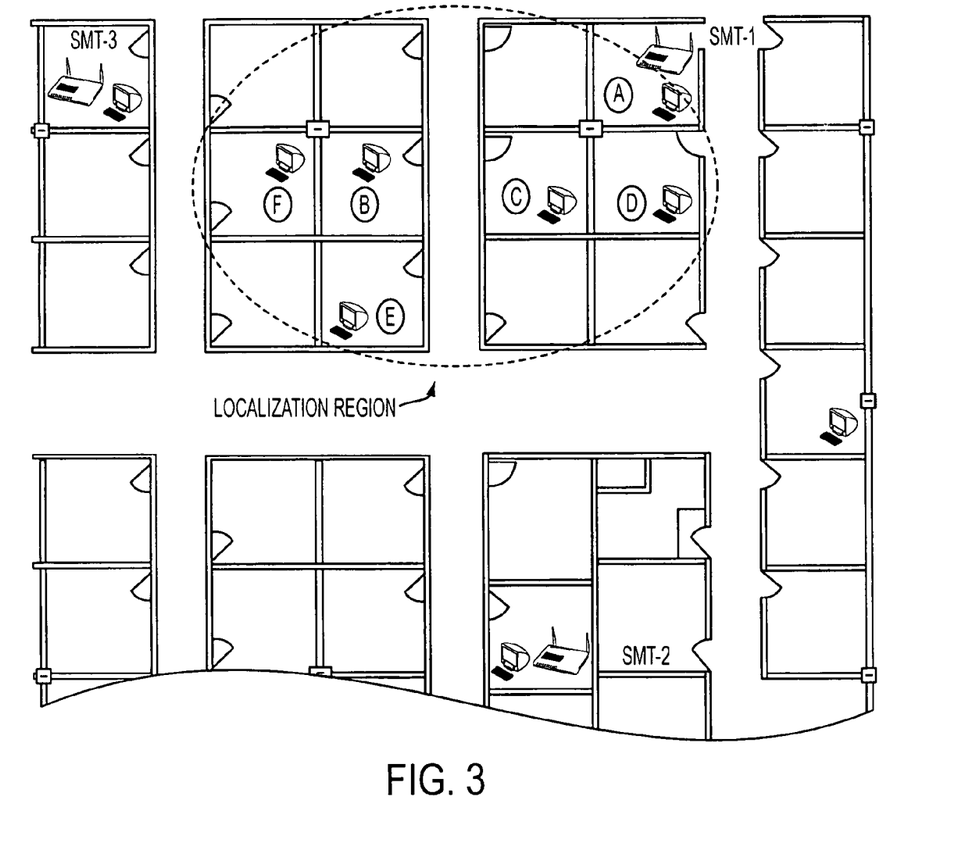
FIG. 3 depicts the empirical testbed used for experimental evaluation of a localization system in accordance with of an exemplary embodiment of the present invention.

FIG. 3 depicts the empirical testbed used for experimental evaluation of a localization system in accordance with of an exemplary embodiment of the present invention. The empirical testbed employs 3 SMTs and 9 RPs. An LC is used that is connected to the SMTs and RPs via a wired network. A client running Linux is localized as part of the experiments. Each SMT runs the Linux operating system and uses an application layer software module to transmit SMs in response to LC commands. Every RP is a standard PC running Windows with a standard USB network antenna and uses an application layer software module to receive SM broadcasts and report them to the LC. The client is a standard laptop with the same type of USB wireless antenna as the RPs. The LC is a standard laptop running Linux.

Each point marked A through F in FIG. 3 corresponds to a location where the client was placed and localized using the localization system. The empirical results were collected by positioning the client at a location and running the localization system several times at that location.

Approximately 80 localization experiments were conducted over several weeks. During each localization experiment, the LC iterated over each of the 3 SMTs. At each SMT it iterated over 26 different transmission power levels. 14 SM transmissions were requested at each power level. In addition to computing client localization errors, SM reports were stored from each of the RPs and the client for each of the localization experiments in an SM report log. SM report logs were used to test the Security Hypothesis verification experiments and were processed offline to simulate random SM suppressions in client reports.

2) Localization Results

Figure 4:
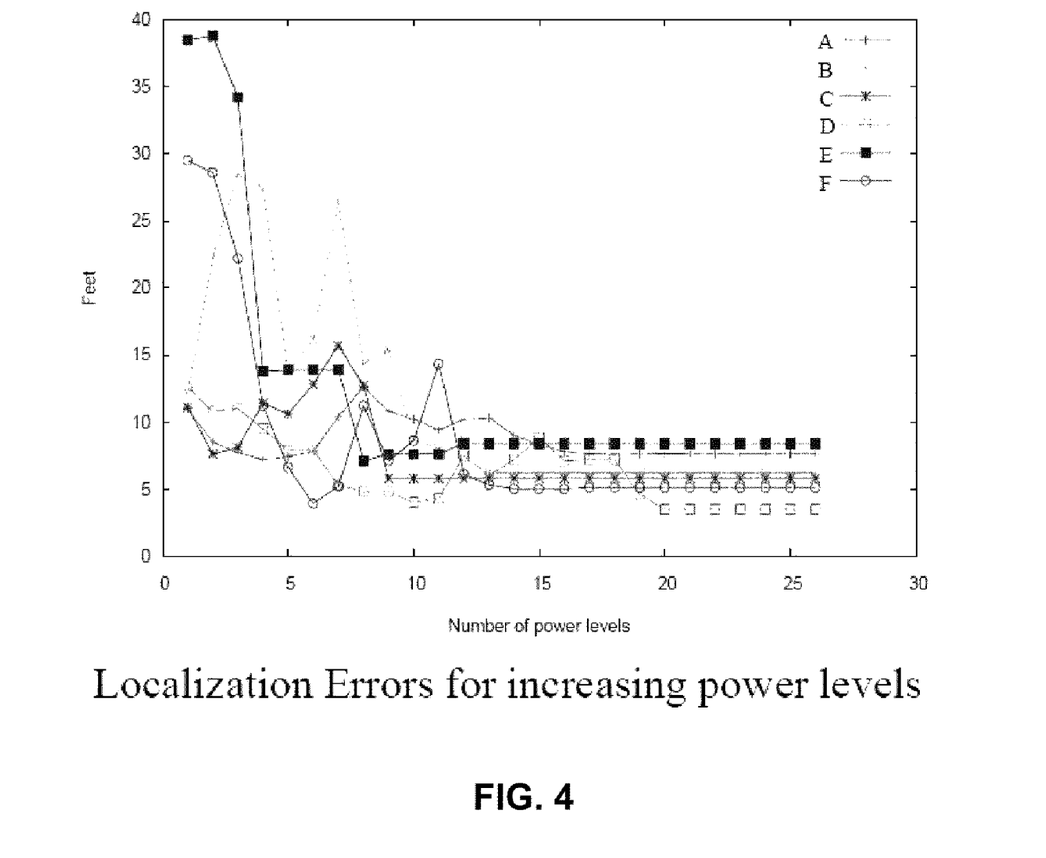
FIG. 4 illustrates results of the localization experiments conducted using the empirical testbed depicted in FIG. 3, with an emphasis on localization errors for increasing power levels.

FIG. 4 illustrates results of the localization experiments conducted using the empirical testbed depicted in FIG. 3, with an emphasis on localization errors for increasing power levels. Localization results are shown for an increasing number of considered transmission power levels starting with the lowest power level and incrementally adding the next higher power level. As FIG. 4 shows, localization errors are seen to generally diminish as the number of power levels is increased. On average, client localization errors are seen to be within 3-8 feet of their true location with location D showing the smallest and location E showing the largest localization errors respectively. While the results shown represent averages, 95% confidence intervals do not add much more than a foot to the localization error.

3) Security Hypotheses Verification

Figure 5:
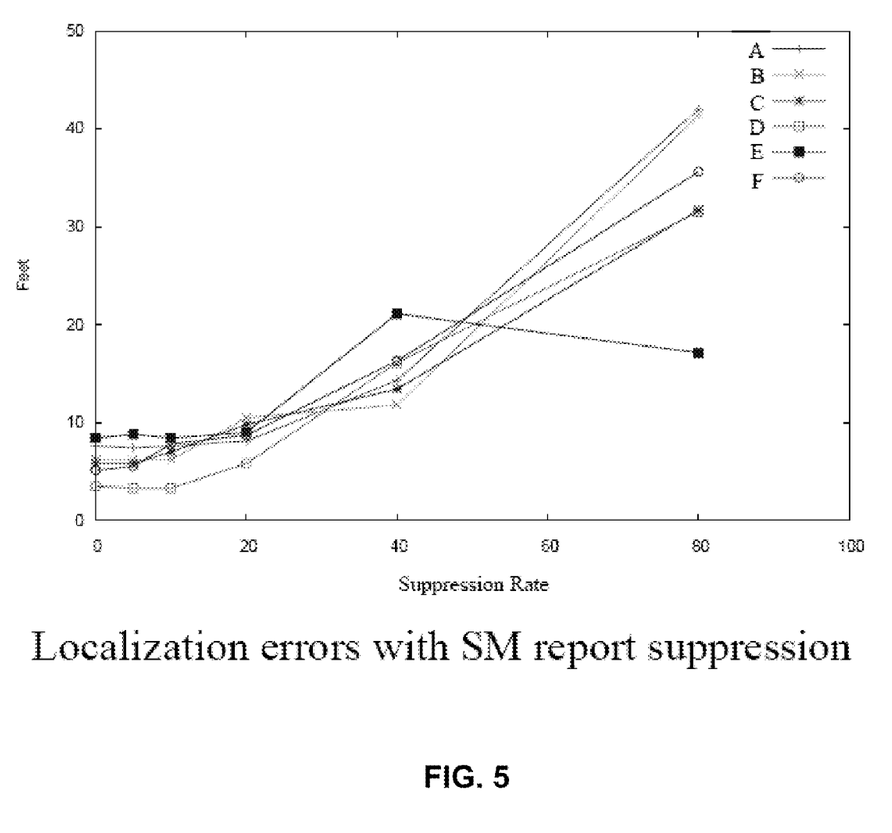
FIG. 5 shows localization errors incurred by the localization system using the empirical testbed depicted in FIG. 3 when portions of SM reports are suppressed by the client.

Next, Hypothesis 1 is experimentally verified. As discussed above, the only manner in which a client could deceive the localization system of the present invention would be by arbitrarily suppressing SMs in reports to the LC. FIG. 5 shows localization errors incurred by the localization system using the empirical testbed depicted in FIG. 3 when portions of SM reports are suppressed by the client. Results for all 26 transmission power levels are considered.

In the experiment conducted, the suppression rate varied from 0 to 80% of reported SMs. As can be seen in FIG. 5, localization errors increase with the rate of SM suppression. For example, the average error for localizations at location A is around 8 feet. When the fraction of suppressed SMs is lower than 20% this error does not increase significantly. However, for a 40% suppression rate, the localization error climbs to about 13 feet and to about 40 feet for an 80% suppression rate. For the bulk of the locations, a 40% suppression rate can raise the localization error to around 15-20 feet. An exception is location B, where the localization error stays closer to 10 feet despite the 40% SM suppression. In general, it can be concluded that localization errors rise with an increase in the SM suppression rate, with small change in localization errors for small SM suppression rates. These results are consistent with Hypothesis 1 above.

Figure 6:
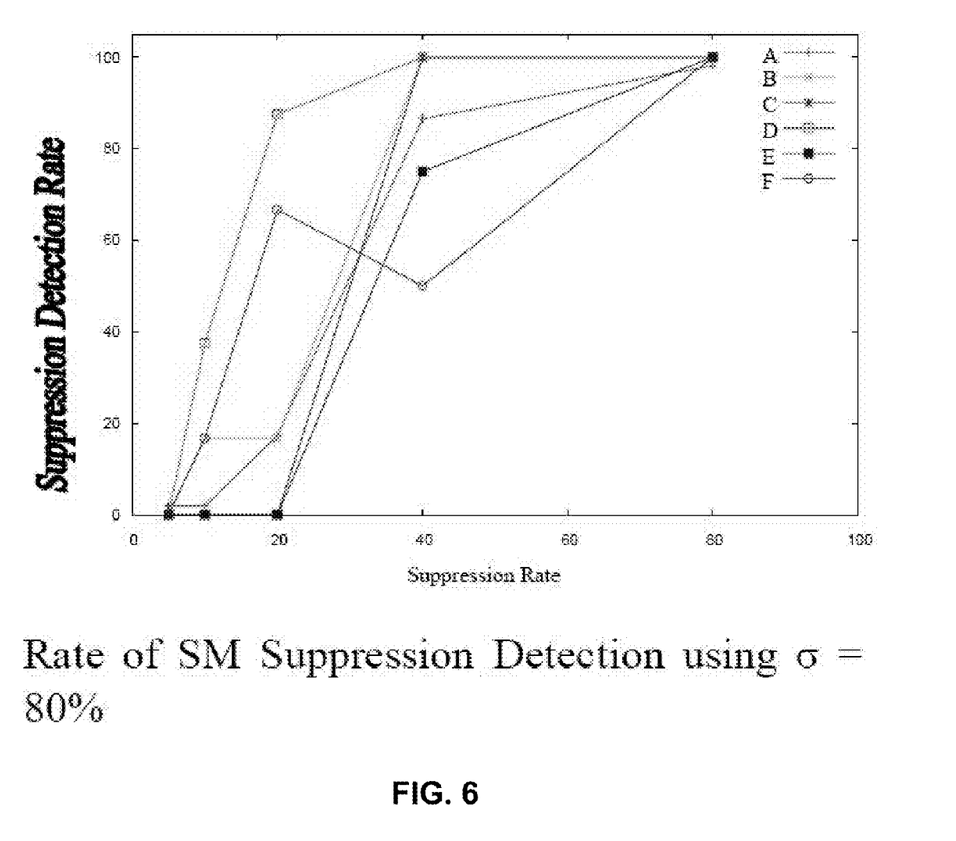
FIG. 6 shows the rate of SM suppression detection by the localization system using the empirical testbed depicted in FIG. 3 when SM Suppression Detection Threshold σ=80%.

The results shown in FIG. 5 indicate that a 40% SM suppression rate can cause significant localization error. According to hypothesis 2, in such cases the number of SMs received at the client should be less than those received at the RP nearest to the client's estimated location. An SM Suppression Detection Threshold a can be defined as the percentage value of the ratio of the number of SMs reported by the client to the number of SMs reported by the RP nearest to client's estimated location. In the results shown in FIG. 6, the localization system detects SM suppression using a Suppression Detection Threshold σ=80%. For the bulk of the locations, the localization system is able to detect 80-100% of the instances of (40%) SM suppression.

One exception is location F where the detection rate is closer to 50%. For false negatives, the localization system estimated the location of the client in the neighborhood of the RP next to SMT-2 or the RP next to SMT-3. Both these RPs are located well outside the region within which localization is being performed. Further examination of the data showed that these RPs, in general, received relatively fewer SMs than the ones located within the region. Accordingly, these RPs did not have substantially larger SM set sizes than the client with a 40% suppression rate. Removing these RPs from consideration, the detection rate for location F is closer to 100%.

Finally, the false positives encountered as a consequence of using the threshold a to detect SM suppression were examined. Setting σ=80% results in a lower than 2% false positive rate. Higher values of a incur substantially higher false positive rates for most of the client locations. This is because of small discrepancies between SM sets reported by a client and its true nearest RPs.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims.

What is claimed is:

1. A secure localization system, comprising:
   user devices;
   at least one secure message transmitter (SMT) for transmitting secure messages (SMs) using multiple transmission power levels, the SMs comprising a set of identifiers comprising identifiers for the SMT transmitting the message and power level used for transmission, and an identifier for each SM itself;
   a plurality of reference points (RPs) deployed at known locations; and
   a localization controller configured to instruct each SMT to transmit SMs at specific power levels for receipt at the RPs,
   wherein each RP is configured to receive SMs and report the received SMs to the localization controller, each report containing an identifier for the RP in addition to the SM received by it, the localization controller being further configured to determine location of at least one of the user devices by comparing reports from said at least one of the user devices with the reports received from the RPs for the same set of transmitted SMs.

2. The secure localization system of claim 1, wherein the at least one SMT is configured to transmit a plurality of SMs at the same power level.

3. The secure localization system of claim 1, wherein each SMT comprises an encryptor for encrypting SMs.

4. The secure localization system of claim 3, wherein the encryptor is configured to encrypt SMT and power level identifiers.

5. The secure localization system of claim 1, wherein the SMT and power level identifiers are encrypted within the SM.

6. The secure localization system of claim 1, wherein the secure messages further comprise a random number.

7. The secure localization system of claim 1, wherein the localization controller comprises a random number generator.

8. The secure localization system of claim 1, wherein each RP is configured to receive SMs from all SMTs.

9. A method for secure localization to determine a location of user devices in a communications network, the method comprising:
   iteratively selecting each of a set of transmission power levels at one or more secure message transmitters (SMTs);
   generating secure messages (SMs) at one or more of the SMTs, the SMs comprising a set of identifiers comprising identifiers for the SMT transmitting the message and power level used for transmission, and an identifier for each SM itself;
   requesting each SMT to transmit a specific number of SMs at selected power levels;
   responsive to the request, transmitting the specific number of SMs at the specified power level to a plurality of reference points (RPs) deployed at known locations;
   for every RP that receives an SM, reporting the received SM to a localization controller, each report containing an identifier for the RP in addition to the SM received by it; and
   determining the location of at least one of the user devices in the communications network by comparing reports from said at least one of the user devices with the reports received from the RPs for the same set of transmitted SMs.

10. The method of claim 9, wherein the determining step occurs at the localization controller.

11. The method of claim 9, wherein the determining step occurs at the localization controller.

12. The method of claim 9, further comprising:
    encrypting each SM.

13. The method of claim 12, wherein the encrypting step comprises encrypting the SM itself.

14. The method of claim 12, wherein the encrypting step comprises encrypting the set of identifiers within the SM as well as the SM itself.

15. The method of claim 9, further comprising:
    generating a random number for inclusion within an SM.

16. The method of claim 15, further comprising:
    maintaining a record of the last generated random number, the number being associated with a particular SMT identifier, power level identifier and SM identifier.

17. The method of claim 9, further comprising:
    transmitting SMs to a client;
    responsive to receipt of the SMs, reporting the received SMs to the localization controller; and
    determining location of client.

18. The method of claim 17, wherein the determining step comprises estimating the RPs nearest the client and comparing the SMs reported by the client with those reported by the nearest estimated RPs.

19. The method of claim 17, wherein the determining step occurs at the localization controller.

20. The method of claim 17, wherein the determining step occurs at the localization controller.

21. A localization controller for determining a location of user devices in a communications network, comprising:
    a processor configured to instruct at least one secure message transmitter (SMT) to transmit secure messages (SMs) at a specific power level to a plurality of reference points (RPs) deployed at known locations throughout a localization area, the SMs comprising a set of identifiers comprising identifiers for the SMT transmitting the SMs and power level used for transmission, and an identifier for each SM itself, the processor being further configured to receive SM reports transmitted by the RPs, wherein said processor determines the location of at least one of the user devices in the communications network by comparing the reports from said at least one of the user devices with the SM reports received from the RPs for the same set of transmitted messages.

22. The localization controller of claim 21, further comprising:

a random number generator for generating random numbers for inclusion within the SMs; and a data structure for storing data associated with the SMs.

23. The localization controller of claim 22, wherein the data comprises random numbers generated for a particular SMT, power level and SM identifier set.

24. The localization controller of claim 21, wherein the processor is further configured to receive reports transmitted from a client responsive to SMs transmitted to the client and estimate the RPs nearest the client, wherein client positioning can be determined by comparing SMs reported by the RPs with the SM reports transmitted by the client.

* * * * *